United States Patent
Graceffo et al.

(10) Patent No.: US 9,553,687 B1
(45) Date of Patent: Jan. 24, 2017

(54) ORTHOGONAL MODE DIVISION MULTIPLEXING

(71) Applicant: RAYTHEON COMPANY, Waltham, MA (US)

(72) Inventors: Gary M. Graceffo, Sterling, VA (US); Andrew M. Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 45 days.

(21) Appl. No.: 14/192,628

(22) Filed: Feb. 27, 2014

(51) Int. Cl.
    *H04J 11/00* (2006.01)
(52) U.S. Cl.
    CPC .................................. *H04J 11/00* (2013.01)
(58) Field of Classification Search
    CPC ......................................................... H04J 11/00
    See application file for complete search history.

(56) References Cited

U.S. PATENT DOCUMENTS

| | | | |
|---|---|---|---|
| 2002/0068613 A1* | 6/2002 | Miyano et al. | 455/562 |
| 2005/0259914 A1* | 11/2005 | Padgett | H01Q 21/26 385/16 |
| 2015/0168554 A1* | 6/2015 | Aharoni et al. | 455/562 |
| 2015/0171517 A1* | 6/2015 | Grandfield | H01Q 3/28 342/368 |

OTHER PUBLICATIONS

Anthony, Sebastian, "Vortex radio waves could boost wireless capacity 'infinitely'," http://www.extremetech.com/extreme/120803-vortex-radio-waves-could-boost-wireless-capacity-infinitely, 10 pages, Feb. 24, 2014.

\* cited by examiner

*Primary Examiner* — Mohammad Anwar
(74) *Attorney, Agent, or Firm* — Lewis Roca Rothgerber Christie LLP

(57) ABSTRACT

A system for transmitting data using orthogonal mode division multiplexing (OMDM), a multiplexing method derived from the orbital angular momentum of photons. In one embodiment, a transmitter transmits multiple superimposed radio frequency (RF) beams each independently modulated with data, and each with a different orbital angular momentum rotational state. An OMDM receiver receives the different rotational states in separate communications channels. The OMDM states are substantially orthogonal, providing independent data channels for increased data capacity, and providing privacy.

12 Claims, 10 Drawing Sheets

| Mode Number | Number of Elements | Number of States | States | Per Element Phase Step Size (Rads) | Element Phase (Rads) |
|---|---|---|---|---|---|
| 0 | 1 | 0 | 0 | 0 | 0 |
| 1 | 3 | 3 | -1 | -2π/3 | [0, -2π/3, -4π/3] |
|   |   |   | 0 | 0 | [0, 0, 0] |
|   |   |   | 1 | 2π/3 | [0, 2π/3, 4π/3] |
| 2 | 5 | 5 | -2 | -4π/5 | [0, -4π/5, -8π/5, -12π/5, -16π/5] |
|   |   |   | -1 | -2π/5 | [0, -2π/5, -4π/5, -6π/5, -8π/5] |
|   |   |   | 0 | 0 | [0, 0, 0, 0, 0] |
|   |   |   | 1 | 2π/5 | [0, 2π/5, 4π/5, 6π/5, 8π/5] |
|   |   |   | 2 | 4π/5 | [0, 4π/5, 8π/5, 12π/5, 16π/5] |
| 3 | 7 | 7 | -3 | -6π/7 | [0, -6π/7, -12π/7, -18π/7, -24π/7, -30π/7, -36π/7] |
|   |   |   | -2 | -4π/7 | [0, -4π/7, -8π/7, -12π/7, -16π/7, -20π/7, -24π/7] |
|   |   |   | -1 | -2π/7 | [0, -2π/7, -4π/7, -6π/7, -8π/7, -10π/7, -12π/7] |
|   |   |   | 0 | 0 | [0, 0, 0, 0, 0, 0, 0] |
|   |   |   | 1 | 2π/7 | [0, 2π/7, 4π/7, 6π/7, 8π/7, 10π/7, 12π/7] |
|   |   |   | 2 | 4π/7 | [0, 4π/7, 8π/7, 12π/7, 16π/7, 20π/7, 24π/7] |
|   |   |   | 3 | 6π/7 | [0, 6π/7, 12π/7, 18π/7, 24π/7, 30π/7, 36π/7] |

*FIG. 3*

| Mode | 2 | | | |
|---|---|---|---|---|
| Transmit Antenna Phase Coefficient | | | | |
| | Antenna Element Number | | | |
| State Number | 1 | 2 | 3 | 4 |
| -2 | $2\pi(-2/5)$ | $2\pi(-4/5)$ | $2\pi(-6/5)$ | $2\pi(-8/5)$ |
| -1 | $2\pi(-1/5)$ | $2\pi(-2/5)$ | $2\pi(-3/5)$ | $2\pi(-4/5)$ |
| 0 | 0 | 0 | 0 | 0 |
| 1 | $2\pi(2/5)$ | $2\pi(4/5)$ | $2\pi(6/5)$ | $2\pi(8/5)$ |
| 2 | $2\pi(1/5)$ | $2\pi(2/5)$ | $2\pi(3/5)$ | $2\pi(4/5)$ |
| Number of Elements | 5 | | | |

*FIG. 6*

| Mode | 2 | | | | |
|---|---|---|---|---|---|
| Receive Antenna Phase Coefficient | | | | | |
| | Antenna Element Number | | | | |
| State Number | 0 | 1 | 2 | 3 | 4 |
| -2 | | 2π(-8/5) | 2π(-6/5) | 2π(-4/5) | 2π(-2/5) |
| -1 | | 2π(-4/5) | 2π(-3/5) | 2π(-2/5) | 2π(-1/5) |
| 0 | | 0 | 0 | 0 | 0 |
| 1 | | 2π(4/5) | 2π(3/5) | 2π(2/5) | 2π(1/5) |
| 2 | | 2π(8/5) | 2π(6/5) | 2π(4/5) | 2π(2/5) |
| Number of Elements | 5 | | | | |

*FIG. 9*

ORTHOGONAL MODE DIVISION MULTIPLEXING

BACKGROUND

1. Field

One or more aspects of embodiments according to the present invention relate to the transmission of data, and more particularly to a system and method for transmitting data on multiple superimposed beams of electromagnetic waves with photons in different angular orbital momentum states.

2. Description of Related Art

Communication using free-space electromagnetic waves such as free-space radio frequency (RF) or microwave waves is common in various applications. In such a communication system it may be advantageous to send data with low error rates without using more power than necessary. For a single channel of a certain bandwidth, the data rate possible at a given error rate increases only logarithmically with the signal to noise ratio. Therefore, if a system with one channel is transmitting enough power to achieve a good signal to noise ratio, it may be more power-efficient to increase the bandwidth of the channel, or to add channels, than to increase the power in the existing channel. Increasing the bandwidth of the channel may in some cases, however, face technical obstacles.

Free-space communications may also pose problems related to privacy when, for example, confidential data are transmitted by a sender to an intended recipient, and a third party may intercept a beam of electromagnetic waves, and receive the confidential data.

Thus, there is a need for a system for transmitting data power-efficiently in a manner providing privacy protection.

SUMMARY

In one embodiment, a system for transmitting data using orthogonal mode division multiplexing (OMDM), a multiplexing method derived from the orbital angular momentum of photons, is provided. A transmitter transmits multiple superimposed radio frequency (RF) beams each independently modulated with data, and each with a different orbital angular momentum rotational state. An OMDM receiver receives the different rotational states in separate communications channels. The OMDM states are substantially orthogonal, providing independent data channels for increased data capacity, and providing privacy.

According to an embodiment of the present invention there is provided a system for communication including a transmitter for transmitting data, the transmitter including: a transmitter circuit; and a transmitting array antenna; the transmitting array antenna including a plurality of transmitting antenna elements, the transmitter circuit including a plurality of outputs, each of the plurality of outputs connected to a corresponding one of the plurality of transmitting antenna elements, the transmitter circuit including a first channel, a second channel, and a third channel, each of the first channel, the second channel, and the third channel including: a modulator for modulating a data stream onto a carrier signal, the transmitter circuit and the transmitting array antenna configured to transmit: a first radio frequency (RF) beam; a second RF beam; and a third RF beam, the first RF beam, the second RF beam and the third RF beam being superimposed on each other, the first RF beam comprised substantially of a first rotational state, the second RF beam comprised substantially of a second rotational state, and the third RF beam comprised substantially of a third rotational state.

In one embodiment, the transmitting array antenna includes a minimum of 2M+1 transmitting antenna elements, M being a positive integer, and the transmitter circuit includes 2M+1 outputs, each of the 2M+1 outputs connected to a corresponding one of the 2M+1 transmitting antenna elements.

In one embodiment, the transmitting antenna elements are arranged at substantially equal spacing in a circular pattern.

In one embodiment, the first rotational state is associated with a state number $M_j$, and the transmitter circuit is configured to provide, to each of the 2M+1 transmitting antenna elements, a signal with a phase given by $$\phi_{i,j} = \frac{N_i * M_j}{N} 2\pi$$

wherein $N_i$ is the number of the transmitting antenna element, and $N=2M+1$ is the number of transmitting antenna elements.

In one embodiment, the system includes a receiver, the receiver including a receiving array antenna and a receiver circuit.

In one embodiment, the system includes 2M+1 outputs, each of the 2M+1 outputs connected to a corresponding one of the 2M+1 receiving antenna elements.

In one embodiment, the receiving antenna elements are arranged at substantially equal spacing in a circular pattern.

In one embodiment, the receiver circuit includes a channel configured to receive a signal in a corresponding rotational state, with a state number $M_j$.

In one embodiment, the receiver circuit is configured to apply, for each channel, to a signal received by each antenna element, a phase given by $$\psi_{i,j} = \left(M_i - \frac{M_i N_i}{N}\right) 2\pi$$

wherein $N_i$ is the number of the receiving antenna element, and $N=2M+1$ is the number of receiving antenna elements.

According to an embodiment of the present invention there is provided a method for transmitting data from a transmitter to a receiver, the method including: receiving, by the transmitter, the data to be transmitted; modulating, by the transmitter, a radio frequency (RF) signal with the data, transmitting, by the transmitter: a first RF beam; a second RF beam; and a third RF beam, the first RF beam, the second RF beam and the third RF beam being superimposed on each other, the first RF beam comprised substantially of a first rotational state, the second RF beam comprised substantially of a second rotational state, and the third RF beam comprised substantially of a third rotational state.

In one embodiment, the method includes 2M+1 transmitting antenna elements, M being a positive integer, and the transmitter circuit including 2M+1 outputs, each of the 2M+1 outputs connected to a corresponding one of the 2M+1 transmitting antenna elements.

In one embodiment, the transmitting antenna elements are arranged at substantially equal spacing in a circular pattern.

In one embodiment, the transmitting, by the transmitter, of the first RF beam includes driving, by the transmitter circuit, each of the transmitting antenna elements, with a signal with a phase given by $$\phi_{i,j} = \frac{N_i * M_j}{N} 2\pi$$

wherein $M_j$ is a state number of the rotational state of the first RF beam, $N_i$ is the number of the transmitting antenna element, and $N=2M+1$ is the number of transmitting antenna elements.

In one embodiment, the receiver includes a receiving circuit and a receiving array antenna.

In one embodiment, the method includes receiving, by the receiver, an RF beam comprised substantially of a rotational state with a state number $M_j$.

In one embodiment, the receiving antenna includes 2M+1 receiving antenna elements, M being a positive integer.

In one embodiment, the receiving antenna elements are arranged at substantially equal spacing in a circular pattern.

In one embodiment, the receiving, by the receiver, of an RF beam comprised substantially of a rotational state includes applying, to a signal received by a receiving antenna element, a phase given by $$\psi_{i,j} = \left(M_i - \frac{M_i N_i}{N}\right) 2\pi$$

wherein $N_i$ is the number of the receiving antenna element, and $N=2M+1$ is the number of receiving antenna elements.

BRIEF DESCRIPTION OF THE DRAWINGS

Features, aspects, and embodiments are described in conjunction with the attached drawings, in which:

FIG. 3 is a table showing characteristics and phases for antennas of various modes according to an embodiment of the present invention;

FIG. 6 is a table of antenna element phases for various antenna elements and rotational states according to an embodiment of the present invention;

FIG. 9 is a table of antenna element phases for various antenna elements and rotational states according to an embodiment of the present invention.

DETAILED DESCRIPTION

The detailed description set forth below in connection with the appended drawings is intended as a description of exemplary embodiments of a system and method for orthogonal mode division multiplexing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
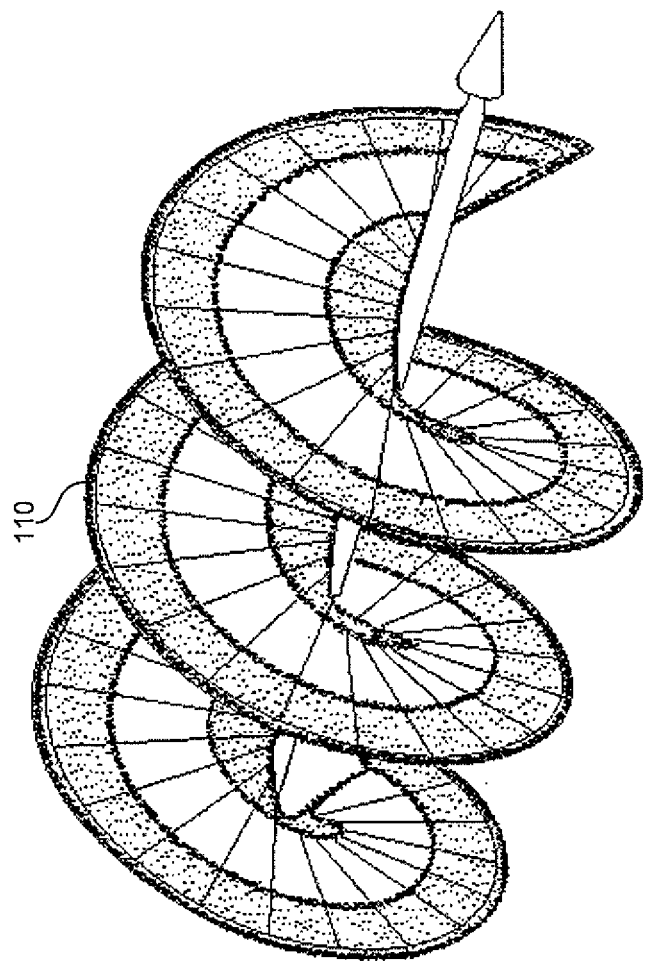
FIG. 1A is an illustration of the wave front of a beam in a rotational state according to an embodiment of the present invention.
Figure 1B:
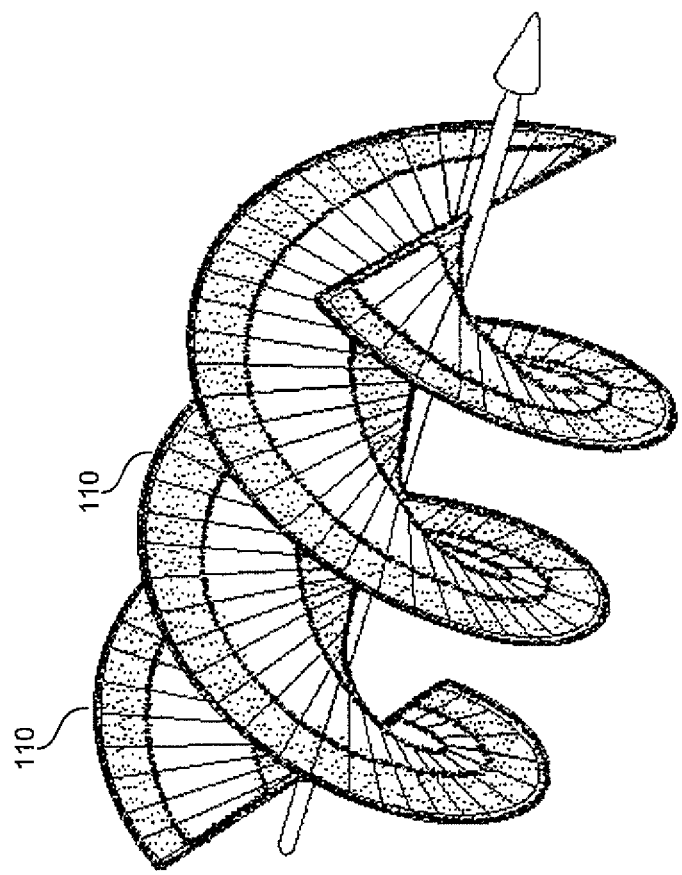
FIG. 1B is an illustration of the wave front of a beam in another rotational state according to an embodiment of the present invention.

Referring to FIG. 1A and FIG. 1B, in one embodiment, a transmitter transmits a radio frequency (RF) electromagnetic wave with a finite transverse extent, i.e., a beam, with surfaces of constant phase which form a helical spiral pattern. In any reference plane perpendicular to the direction of propagation of the beam, the phase is constant along any radial line drawn outwards from the center of the beam, and varies in direct proportion to azimuthal angle, i.e., the angle between the radial line and a fixed radial reference line. In the wave of FIG. 1A, the phase varies by $2\pi$ radians per $2\pi$ radians of azimuth angle, and the wave has a single helical spiral wave front 110. The wave of FIG. 1B, has two intertwined helical spiral wave fronts 110, each with twice the pitch of that of FIG. 1A, and in the wave of FIG. 1B, the phase varies by $4\pi$ radians per $2\pi$ radians of azimuth angle. The waves of both FIG. 1A and FIG. 1B both have a positive chirality, i.e., they are right handed. A wave in this context has a positive chirality if the chirality of the helical spiral wave front 110 is the same as that of a right-handed screw. The term "radio frequency" or "RF" as used herein includes microwaves and millimeter waves, i.e., a frequency range spanning from approximately 1 megahertz (MHz) to 1000 gigahertz (GHz).

Similarly, a beam may have, for example, a rate of change of phase with azimuth angle of $6\pi$, $8\pi$, or $10\pi$ radians per $2\pi$ radians of azimuth angle, or the chirality may be negative, so that the phase changes, e.g., $-2\pi$, $-4\pi$, or $-8\pi$ radians per $2\pi$ radians of azimuth angle. Each case corresponds to each photon in the electromagnetic wave having a different quantity of orbital angular momentum. These different possibilities are referred to herein as states of the electromagnetic wave, with the states numbered [ . . . , -2, -1, 0, 1, 2, . . . ], so that for orbital angular momentum state n, the phase changes by $2\pi n$ radians per $2\pi$ radians of azimuth angle. A wave of state n consists of $|n|$ intertwined wave fronts, each of which completes a $2\pi$ rotation, spatially, per $|n|$ wavelengths of propagation distance. The special case n=0 corresponds to a plane wave with no rotation.

Waves with different states are orthogonal. This property allows multiple transmissions to occur simultaneously on the same frequency using differing states on a non-interfering basis. Moreover, the use of multiple states provides a degree of privacy: unless the states being used are known to the receiving party, the signal is difficult to find. A receiver configured to receive plane waves, for example, and receiving the entire wave for a state with n different from 0, will not detect a significant signal amplitude because of the orthogonality property of waves with different values of n.

The transmission of multiple waves in different states is referred to herein as orthogonal mode division multiplexing (OMDM). In one embodiment, OMDM is analogous to orthogonal frequency division multiplexing; however, instead of spreading a symbol over multiple subcarriers of different frequencies as is done in orthogonal frequency division multiplexing, a symbol is spread over multiple rotational states, at the same frequency. In essence, any number of states may be used simultaneously, where each state is an independent communications channel. OMDM is also similar to code division multiple access (CDMA), where one must know the spreading code, or frequency division multiple access (FDMA), where one needs the hop sequence to recover a signal of interest, to receive transmitted data. When OMDM is used to transmit data, a receiving party lacking knowledge of which rotational states are being used may have difficulty detecting the signal and receiving the data.

Also, as is the case with CDMA, when OMDM is used, multiple simultaneous transmissions can coexist on the same frequency at the same time on a non-interfering basis. At the receiver, each state forms a channel which may be independently processed.

The number of states supported by an OMDM system is, in one embodiment, determined by the mode number M, which is a property of the transmitting or receiving antenna. There are 2M+1 states for a given mode. The states are [0, ±1, ±2, . . . , ±M], where M is an integer number greater than or equal to zero (M≥0). Each higher order mode, M, is inclusive of all the states associated with the previous M−1 modes. An antenna having a certain mode may transmit all of the states that an antenna with a lower mode may transmit. For example, mode 1 has states [−1 0 1] and mode 2 has states [−2 −1 0 1 2]. The state number determines the number of rotations per wavelength for a given state. That is, state 1 has one right-hand rotation per wavelength; state 2 has two right-hand rotations per wavelength, state −2 has two left-hand rotations per wavelength, etc.

Figure 2:
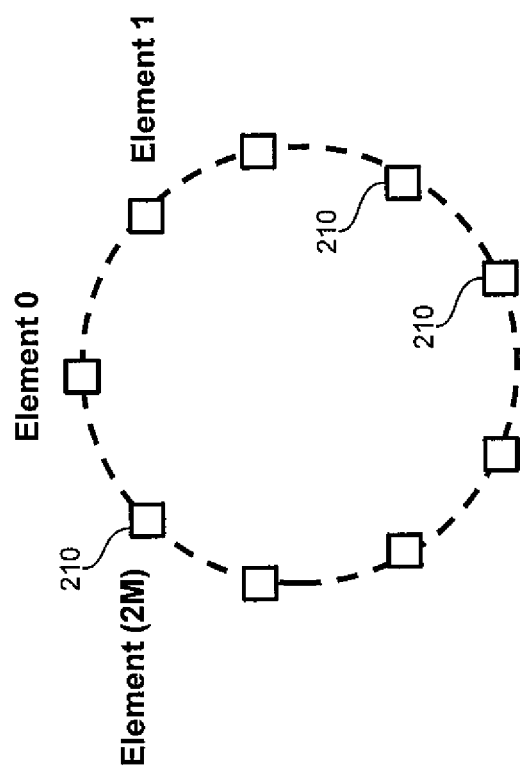
FIG. 2 is a schematic diagram of an array antenna for transmitting or receiving a beam in a rotational state according to an embodiment of the present invention.

Referring to FIG. 2, in one embodiment an antenna for transmitting or receiving OMDM waves is constructed as an array antenna, with 2M+1 antenna elements 210 for a mode M antenna, suitable for transmitting or receiving states with n=[0, ±1, ±2, . . . , ±M]. A suitably configured transmitter circuit may be employed to drive the antenna elements 210 with relative phases selected to transmit one or more states, each independently modulated. The table of FIG. 3 summarizes the relationship between modes, states, the number of antenna elements 210, and their phases, for the first four modes.

OMDM is a block-oriented multiplexing method in which data symbols are transmitted over a number of states, where each state is an independent channel. Depending on the application, channels may be used collectively either for improved error performance through redundancy or for increased throughput.

In one embodiment, OMDM is generated by parallelizing k serial data bits at a time into 2M+1 parallel data symbol streams. The 2M+1 symbol streams are independently modulated onto each of the available 2M+1 states. Each serial data symbol is of duration Ts. After parallelization, 2M+1 symbols are transmitted during the period Ts. The waveform equation is as follows:

$$S(t) = (A_i D_i \hat{\Phi}_{-M} + A_{i+1} D_{i+1} \hat{\Phi}_{-M+1} + \ldots + A_{i+2M} D_{i+2M} \hat{\Phi}_M) e^{jwt}$$

where S(t) is the waveform, the $A_i$ are the state amplitudes for the $i^{th}$ symbol, the $D_i$ are the data symbols, w is the operating radian frequency, $\hat{\Phi}_n$ defines the state used, where n is the state number, defined over the range n=[0, ±1, ±2, . . . , ±M]. In this notation, the orthogonality of the states means that the dot product of $\hat{\Phi}_n$ and $\hat{\Phi}_m$ is zero for n not equal to m, and 1 otherwise. Each state may be implemented by applying the proper phasing to each antenna element 210. The table of FIG. 3 provides the phasing for the first four modes.

Figure 4:
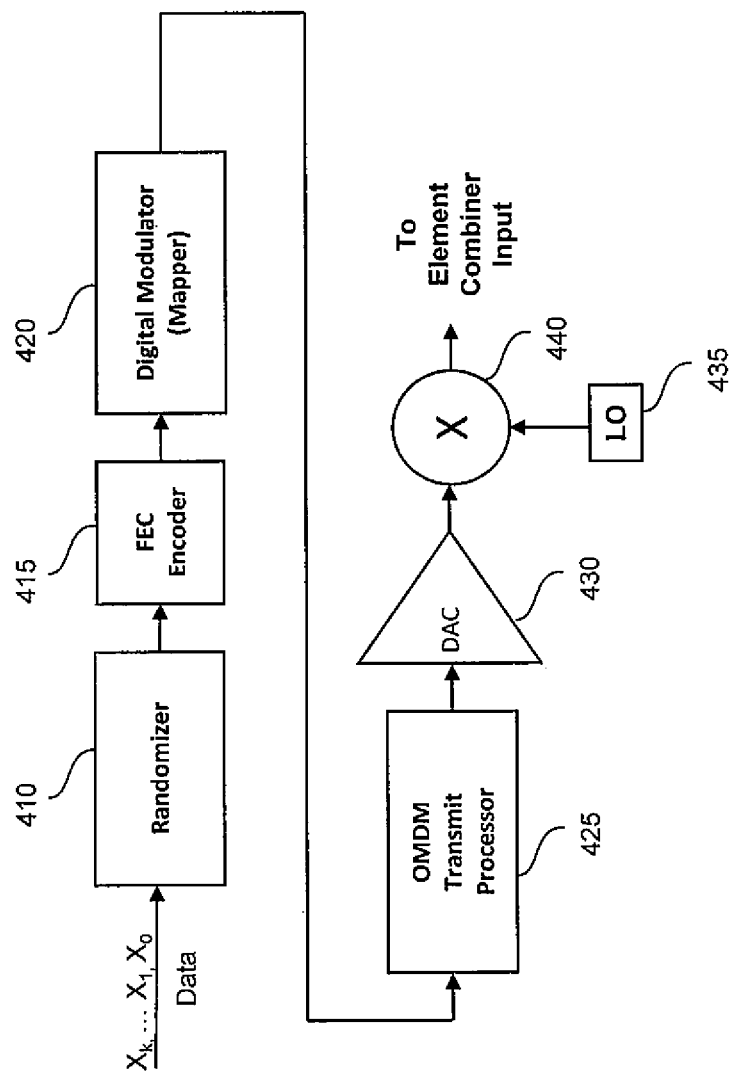
FIG. 4 is a block diagram of a transmitter circuit according to an embodiment of the present invention.

Referring to FIG. 4, an OMDM transmitter circuit, which may be employed to drive an OMDM array antenna, may be constructed from a randomizer 410, a forward error correction (FEC) encoder 415, a digital modulator 420, which may also be referred to as a mapper, an OMDM transmit processor 425, a digital to analog converter (DAC) 430, and an upconverter which may include a local oscillator (LO) 435 and a mixer 440. Several digital to analog converters (DACs) 430, local oscillators (LOs) 435, and mixers 440 may be connected to the OMDM transmit processor 425, to drive several antenna element combiners, although only one of each is illustrated in FIG. 4.

Figure 5:
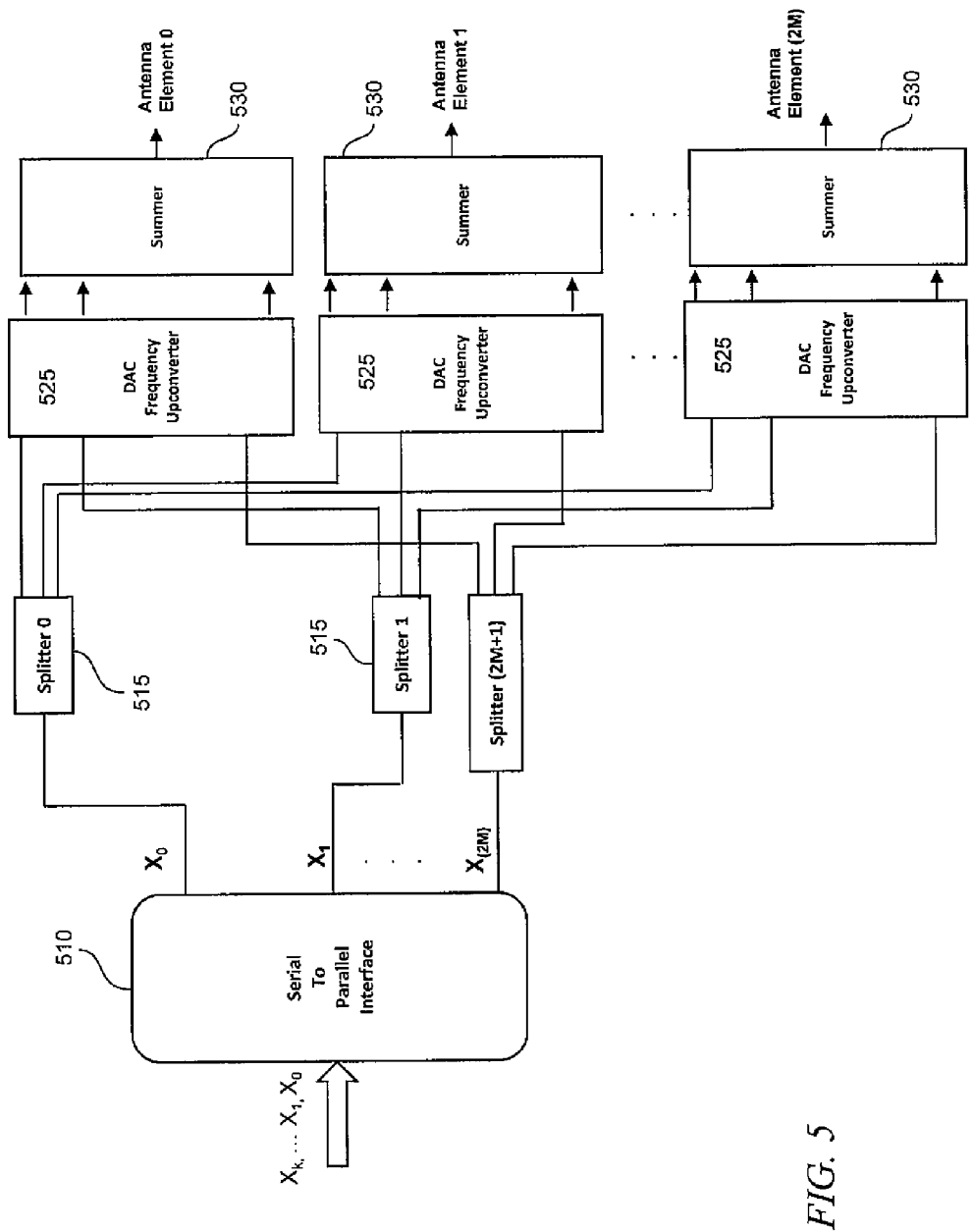
FIG. 5 is a detailed block diagram of a transmitter circuit according to an embodiment of the present invention.

Several of the components of an OMDM transmitter circuit are illustrated in greater detail in FIG. 5. According to one embodiment, an arbitrarily long serial symbol stream $X_k, \ldots X_1, X_0$, is provided to the input of the serial-to-parallel (STP) converter 510. The STP converter 510 has (2M+1) outputs labeled $X_0$ through $X_{2M}$, one for each state to be transmitted. The STP outputs all state −M data on channel 0, all state −(M+1) data on channel 1, and so on, up to state M, data for which are output on channel 2M. The STP outputs are split 2M+1 times by splitters 515 to provide one feed to each antenna element 210. In one embodiment the splitters 515 are fan-out buffers. The digital modulation is then, in a DAC and frequency converter block 525, converted to analog by a DAC and mixed up to the carrier frequency to be transmitted, using a local oscillator having a suitable phase for the state being modulated and the antenna element to which the DAC and frequency converter block 525 is connected. Finally, the signal to be transmitted by each antenna element 210 is formed by a summer 530, which sums the outputs, from each of the DAC and frequency converter blocks 525, corresponding to the antenna element 210. Each of the summers 530 provides the sum of the phase shifted states to one of the antenna elements 210.

The phase shift applied to the data set for each state is a function of the state number $M_j$, (also referred to as n, above), antenna element number $N_i$, and the number N of antenna elements 210, where N=2M+1. The total phase shift required for each state, for one complete rotation about the array is $|M_j|*2\pi$ and the direction of phase rotation is given by the sign of $M_j$, where a positive sign is clockwise rotation and a negative sign is counter clockwise rotation. A partial phase shift is applied to each antenna element 210 such that the total phase shift is $|M_j|*2\pi$. For an array antenna having elements arranged at substantially equal spacing in a circular pattern (as illustrated in FIG. 2), the phase for each antenna element may be calculated according to the following equation:

$$\phi_{i,j} = \left(\frac{N_i * M_j}{N}\right) 2\pi$$

where j=[0, 1, 2, . . . 2M] is the channel number, $M_j$=j−M is the state number, N=2*M+1 is the number of antenna elements 210, $N_i$ is the antenna element index, where i=0, 1, . . . , N−1, and $\phi_{i,j}$ is the transmit phase coefficient, i.e., the fraction of a 2π phase rotation associated with each element for each state. As an example, the table of FIG. 6 contains the transmit phase coefficients for a Mode 2, 5-element array. Antenna element 0 of the array antenna has no phase shift regardless of the state being transmitted and the transmit phase coefficients increase from left to right in the table, incrementing with each step to the right by the phase value shown for antenna element 1.

Figure 7:
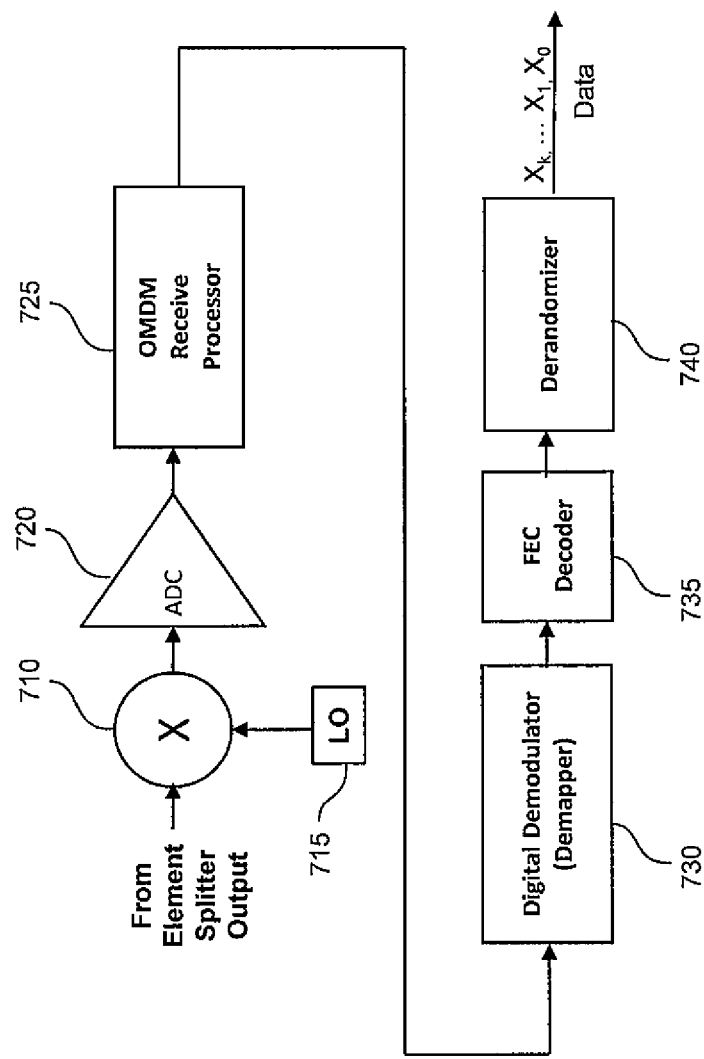
FIG. 7 is a block diagram of a receiver circuit according to an embodiment of the present invention.

In one embodiment, an OMDM receiver performs the same functions as an OMDM transmitter, in the reverse order. The receiver may include a receiving antenna and a receiver circuit; the receiving antenna may be an array antenna with antenna elements arranged at substantially equal spacing in a circular pattern (as illustrated in FIG. 2). Referring to FIG. 7, the received signal from the receiving antenna enters the receiver circuit at a receiver input, on the left in FIG. 7. The signal is down-converted to baseband by a mixer 710 and a local oscillator (LO) 715, and digitized by an analog-to-digital converter (ADC) 720. An OMDM receive processor 725 is used to separate each of the received states and return them to a single serial data stream. Several mixers 710, local oscillators (LOs) 715, and analog-to-digital converters (ADCs) 720, receiving signals from several antenna element splitters, may be connected to the OMDM receive processor 725, although only one of each is illustrated in FIG. 7. Once signal separation is completed, the remaining processing is demodulating, by a digital demodulator 730, which may also be referred to as a demapper, decoding the FEC, by an FEC decoder 735, and de-randomizing the data bits, by a derandomizer 740. Once de-randomizing is completed, the transmitted baseband data is fully recovered.

Figure 8:
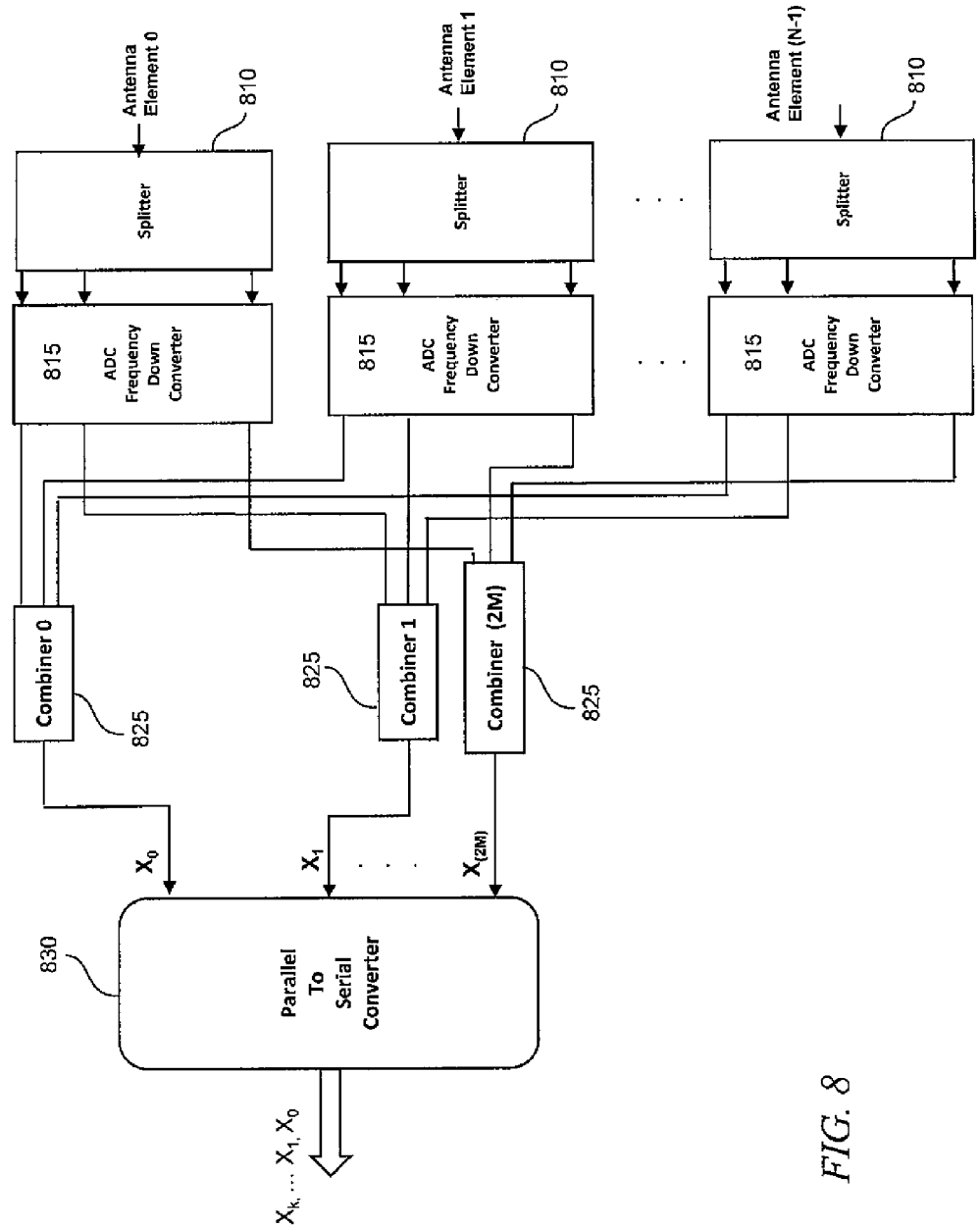
FIG. 8 is a detailed block diagram of a receiver circuit according to an embodiment of the present invention.

Referring to FIG. 8, an analog signal is received over the air by each of the N antenna elements 210 (FIG. 2) and sent to the receiver inputs, split by splitters 810, and, in the ADC and frequency downconverter block 815, mixed down using a local oscillator having a suitable phase for the state being received and the antenna element to which the ADC and frequency downconverter block 815 is connected. Also in the ADC and frequency downconverter block 815, the downconverted signals are digitized, and the digitized signals are provided to combiners 825 for summing. The combiner outputs are serialized in the parallel-to-serial converter 830.

Once the signals have been combined, the original symbol streams have been reconstituted and are ready for digital demodulation. The receive antenna element phase $\psi_{i,j}$ is given by the following equation:

$$\psi_{i,j} = \left(M_i - \frac{M_i N_i}{N}\right) 2\pi$$

The table of FIG. 9 shows receive antenna phase coefficients for a mode 2 antenna.

OMDM has several advantages over other multiplexing methods. It provides greater over-the-air privacy, greater power efficiency than single channel system with fixed bandwidth, greater bandwidth efficiency, and greater immunity to frequency selective fading.

OMDM supports private over-the-air communications, because unless an adverse party knows which states are being used for communication, the adverse party would have to search a potentially large set of states to find the signal of interest. The states need not be contiguous. For example, states [1, −10, and 20] form a valid state set, for an antenna with M=21. Additionally, many of the privacy techniques used in conventional communication are also applicable with the added dimension of state number.

When using OMDM, system throughput is increased by adding more states or channels. The system RF bandwidth remains constant and all transmissions occur on the same frequency. On the basis of the power required to increase system throughput, where the bandwidth is held constant, OMDM is far more efficient than a conventional single carrier system. The power required as additional channels are added to an OMDM system grows linearly with increased throughput, while in a single carrier system the power grows exponentially with increased system throughput, according to the Shannon channel capacity theorem.

Other multiplexing methods require either sharing a resource, such as in time division multiple access (TDMA), or adding additional resources, as in multiplexing methods such as frequency division multiple access (FDMA). OMDM allows for additional users without reducing throughput, as is the case with TDMA or adding resources, such as bandwidth, as is the case for FDMA. OMDM simply continues to stack users on the same frequency, within reasonable limits.

OMDM reduces the probability of experiencing frequency selective fading. Given that narrowband communications use less bandwidth than wideband channels, they are more likely to experience flat fading rather than frequency selective fading. Flat fading is more desirable in a communications channel than frequency selective fading. Conversely, wider bandwidth channels experience the less desirable frequency selective fading. OMDM increases throughput by adding additional states, therefore, it is possible to keep its bandwidths relatively narrow.

Although limited embodiments of a system and method for orthogonal mode division multiplexing have been specifically described and illustrated herein, many modifications and variations will be apparent to those skilled in the art. Accordingly, it is to be understood that a system and method for orthogonal mode division multiplexing employed according to principles of this invention may be embodied other than as specifically described herein. The invention is also defined in the following claims, and equivalents thereof.

What is claimed is:

1. A system for communication comprising a transmitter for transmitting data, the transmitter comprising:
   a transmitter circuit; and
   a transmitting array antenna;
   the transmitting array antenna comprising a plurality of transmitting antenna elements,
   the transmitter circuit comprising a plurality of outputs, each of the plurality of outputs being connected to a corresponding one of the plurality of transmitting antenna elements,
   the transmitter circuit comprising a first channel and a second channel,
   each of the first channel and the second channel comprising a modulator for modulating a data stream onto a carrier signal,
   the transmitter circuit and the transmitting array antenna being configured to transmit:
   a first radio frequency (RF) beam; and
   a second RF beam,
   the first RF beam and the second RF beam being superimposed on each other,
   the first RF beam being comprised of a first rotational state having helical spiral surfaces of constant phase, and the second RF beam being comprised of a second rotational state having helical spiral surfaces of constant phase, the helical spiral surfaces of constant phase of the first rotational state being different from the helical spiral surfaces of constant phase of the second rotational state, wherein the transmitting array antenna comprises 2M+1 transmitting antenna elements, M being a positive integer, and the transmitter circuit comprises 2M+1 outputs, each of the 2M+1 outputs connected to a corresponding one of the 2M+1 transmitting antenna elements, wherein the transmitting antenna elements are arranged at equal spacing in a circular pattern, and wherein the first rotational state is associated with a state number $M_j$, and the transmitter circuit is configured to provide, to each of the 2M+1 transmitting antenna elements, a signal with a phase given by $$\phi_{i,j} = \frac{N_i * M_j}{N} 2\pi$$

wherein $N_i$ is the number of the transmitting antenna element and N=2M+1 is the number of transmitting antenna elements.

2. The system of claim 1, comprising a receiver, the receiver comprising a receiving array antenna and a receiver circuit.

3. The system of claim 2, wherein the receiving array antenna comprises 2M+1 receiving antenna elements, M being a positive integer, the receiver circuit comprising 2M+1 inputs, each of the 2M+1 inputs connected to a corresponding one of the 2M+1 receiving antenna elements.

4. The system of claim 3, wherein the receiving antenna elements are arranged at equal spacing in a circular pattern.

5. The system of claim 4, wherein the receiver circuit comprises a channel configured to receive a signal in a corresponding rotational state, with a state number $M_j$.

6. The system of claim 5, wherein the receiver circuit is configured to apply, for each channel, to a signal received by each antenna element, a phase given by $$\psi_{i,j} = \left(M_i - \frac{M_i N_i}{N}\right) 2\pi$$

wherein $N_i$ is the number of the receiving antenna element, and N=2M+1 is the number of receiving antenna elements.

7. A method for transmitting data from a transmitter to a receiver, the method comprising:
receiving, by the transmitter, the data to be transmitted;
modulating, by the transmitter, a radio frequency (RF) signal with the data, transmitting, by the transmitter:
a first RF beam; and
a second RF beam,
the first RF beam and the second RF beam being superimposed on each other,
the first RF beam being comprised of a first rotational state having helical spiral surfaces of constant phase, and
the second RF beam being comprised of a second rotational state having helical spiral surfaces of constant phase,
the helical spiral surfaces of constant phase of the first rotational state being different from the helical spiral surfaces of constant phase of the second rotational state,
wherein the transmitter comprises a transmitter circuit and a transmitting array antenna, the transmitting array antenna comprising 2M+1 transmitting antenna elements, M being a positive integer, and
the transmitter circuit comprising 2M+1 outputs, each of the 2M+1 outputs connected to a corresponding one of the 2M+1 transmitting antenna elements,
wherein the transmitting antenna elements are arranged at equal spacing in a circular pattern, and
wherein the transmitting, by the transmitter, of the first RF beam comprises driving, by the transmitter circuit, each of the transmitting antenna elements, with a signal with a phase given by $$\phi_{i,j} = \frac{N_i * M_j}{N} 2\pi$$

wherein $M_j$ is a state number of the rotational state of the first RF beam $N_i$ is the number of the transmitting antenna element, and N=2M+1 is the number of transmitting antenna elements.

8. The method of claim 7, wherein the receiver comprises a receiving circuit and a receiving array antenna.

9. The method of claim 8, comprising receiving, by the receiver, an RF beam comprised of a rotational state with a state number $M_j$.

10. The method of claim 8, wherein the receiving array antenna comprises 2M+1 receiving antenna elements, M being a positive integer.

11. The method of claim 10, wherein the receiving antenna elements are arranged at equal spacing in a circular pattern.

12. The method of claim 11, wherein the receiving, by the receiver, of an RF beam comprised of a rotational state comprises applying, to a signal received by a receiving antenna element, a phase given by $$\psi_{i,j} = \left(M_i - \frac{M_i N_i}{N}\right) 2\pi$$

wherein $N_i$ is the number of the receiving antenna element, and N=2M+1 is the number of receiving antenna elements.

* * * * *